United States Patent
Yiu et al.

(10) Patent No.: US 6,947,549 B2
(45) Date of Patent: Sep. 20, 2005

(54) ECHO CANCELLER

(75) Inventors: Ka Fai Cedric Yiu, Kowloon (HK); Jiaquan Huo, Kowloon (HK); Kok Lay Teo, Kowloon (HK)

(73) Assignee: The Hong Kong Polytechnic University (HK)

(*) Notice: Subject to any disclaimer, the term of this patent is extended or adjusted under 35 U.S.C. 154(b) by 82 days.

(21) Appl. No.: 10/370,335

(22) Filed: Feb. 19, 2003

(65) Prior Publication Data

US 2004/0161101 A1 Aug. 19, 2004

(51) Int. Cl.$^7$ ................................................ H04M 9/08
(52) U.S. Cl. ........................... 379/406.01; 379/406.02; 379/406.03; 379/406.04; 379/406.05; 379/406.06; 379/406.08; 379/406.09
(58) Field of Search .................. 379/406.01–406.16

(56) References Cited

U.S. PATENT DOCUMENTS

| | | | | | |
|---|---|---|---|---|---|
| 6,108,412 A | * | 8/2000 | Liu et al. | ............... | 379/406.09 |
| 6,163,609 A | * | 12/2000 | Makinen et al. | ....... | 379/406.08 |
| 6,611,594 B1 | * | 8/2003 | Benesty et al. | ........ | 379/406.09 |

* cited by examiner

*Primary Examiner*—Sinh Tran
*Assistant Examiner*—Ramnandan Singh
(74) *Attorney, Agent, or Firm*—Jackson Walker, LLP (57) ABSTRACT

An echo canceller includes two parallel filters and a controller. The controller chooses the best of the two filters for the final echo cancellation. The filter coefficients are exchanged between the two filters constantly so that both filters retain performance all the time even if double-talk and echo path variations occur very closely in time. One filter is strongly robust and will not diverge during double-talk, and another filter is weakly robust and will converge rapidly during echo path variation.

19 Claims, 7 Drawing Sheets

ECHO CANCELLER

BACKGROUND TO THE INVENTION

1. Field of the Invention

The present invention relates to echo cancellation in communication systems, and more particularly to echo cancellers.

2. Background Information

Echoes arise at various points in a voice communication system. Without proper control they can cause significant degradation in conversation quality.

In telecommunications systems echoes are caused by an impedance mismatch between two-wire local customer loops coupled to four-wire long distance trunks. If the impedance between the two systems is matched a communication signal passes between them without causing an echo. For various reasons it is difficult to match the impedances exactly. When there is a mismatch part of the signal is reflected back to the far-end talker as an echo. The situation can be further complicated by the presence of two-wire toll switches, allowing intermediate four-two-four wire conversions internal to the network. In telephone connections using satellite links with round-trip delays on the order of 600 ms, line echoes can become particularly disruptive.

Figure 1:
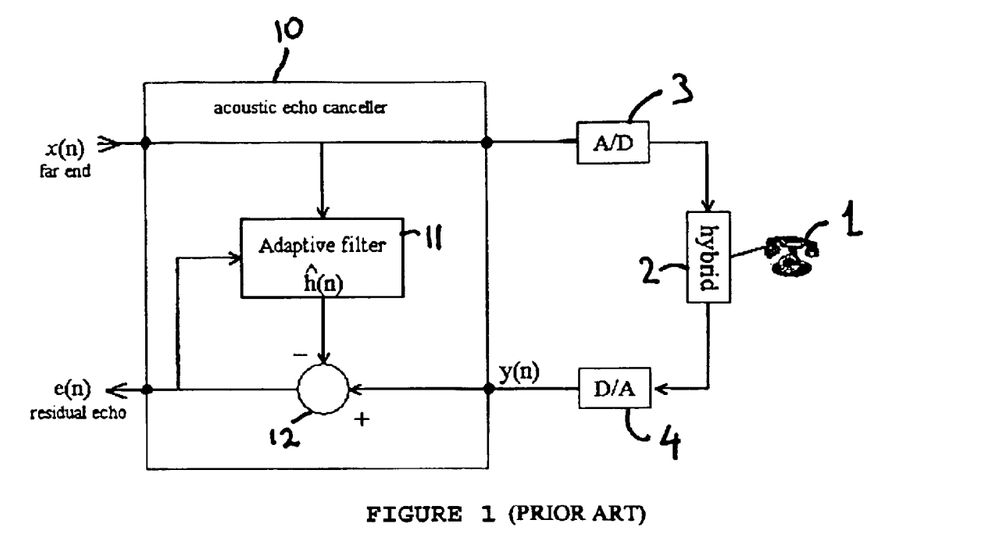
FIG. 1 is a block diagram illustrating a known echo canceller in a telephone network.

FIG. 1 shows a block diagram example of a telecommunications system in which echoes occur. The system comprises conventional telephone set 1, connected to transformer 2 which is fed by an analogue-to-digital (A/D) converter 3. The transformer 2 feeds a conventional digital-to-analogue (D/A) converter 4. The A/D 3 receives a far-end speech signal x(n) from a far-end talker. As a result of the imperfect coupling at the four to two wire junction of transformer 2 the return signal y(n) generated by D/A 4 may contain an echo. Furthermore, the return signal may contain an additional component comprising any ambient noise picked up by telephone 1, and any double-talk which the near-end user of telephone 1 may produce.

In a hands-free communication system, such as videoconferences, mobile telephones and computer multimedia applications, echoes are caused by the microphone picking up sound from the loudspeaker and feeding it back to the far-end talker as an echo. Often the loudspeakers and microphones are placed at a distance from the participants making the echo sound loud and clear. Furthermore, the sound reverberation time in a typical office sized room is several hundreds of milliseconds. This corresponds to several hundred samples at a sampling rate of 8 kHz, which creates high complexity in the implementation of an acoustic echo canceller.

Figure 2:
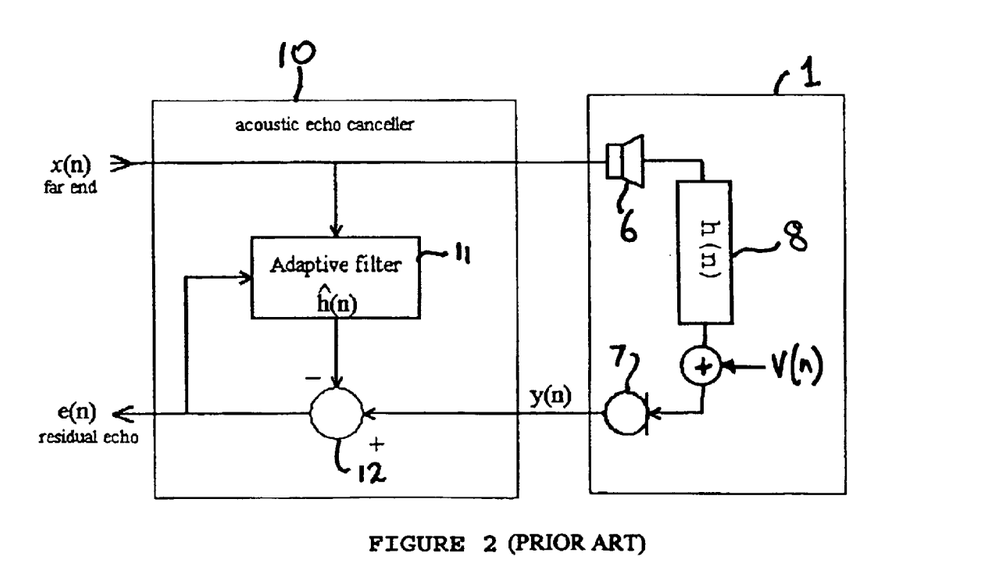
FIG. 2 is a block diagram illustrating a known echo canceller in a hands-free communication system.

FIG. 2 shows a block diagram example of a hands-free environment. It includes a (near-end) receiving room 5, which contains a conventional loudspeaker 6 and a conventional microphone 7. A far-end talker produces a speech signal x(n) which is broadcast over loudspeaker 6. An echo path 8 is created by sound from loudspeaker 6 being received by microphone 7. The echo path 8 is represented by an unknown transfer function h(n) that varies with changes in the room 5 environment such as movement of objects such as the loudspeaker 6, microphone 7 or people; the opening and closing of doors; and changes in room 5 temperature. An echo is transmitted back to the far-end as a return signal y(n). Furthermore, an additional component v(n) comprising background noise or double-talk (a person in room 1 who is also talking) will also be detected by the microphone 7 and form part of the return signal y(n).

Echo cancellers have been developed to suppress these echoes in communication systems. An echo canceller includes an adaptive filter and a subtractor. The incoming signal is passed to the adaptive filter which attempts to models the echo path and estimate the echo. The estimate is subtracted from the return signal to produce an error signal. The error signal is then fed back to the adaptive filter, which adjusts its filter coefficients in order to minimize the error signal, The filter coefficients converge toward values that optimize the estimate signal in order to cancel the echo signal. Echo cancellers are deployed in every telephone network, and are essential for any hands-free speech devices.

Referring to FIGS. 1 and 2, a known acoustic echo canceller 10 comprises an adaptive filter and update module 11, and a conventional subtractor 12. The filter $\hat{h}(n)$ models the echo path and produces an estimate $\hat{y}(n)$ of the echo signal y(n). This estimate is subtracted from the return signal y(n) by subtractor 12 to generate the error signal e(n). The error signal e(n) is returned to the far-end of the telecommunications system. In a closed loop system the error signal e(n) is also feedback to the update module which tries to minimise the error signal e(n) by adapting the coefficients of the filter $\hat{h}(n)$.

In order for the adaptive filter to correctly model the echo path, the output signal y(n) of the echo path must originate solely from its input signal x(n). During double-talking, speech at the near-end that acts as uncorrelated noise causing the filter coefficients to diverge In open-loop paths, coefficient drift is usually not catastrophic although a brief echo may be heard until convergence is established again. In closed-loop paths (which typically include acoustic echo paths) coefficient drift may lead to an unstable system which causes howling and makes convergence difficult. To alleviate this problem double-talk detectors are commonly used for disabling the adaptation during the occurrence of double-talk. Unfortunately, double-talk detectors fail to indicate the presence of double-talk for a whole syllable after double-talk begins. During this time the coefficients may drift and lead to howling as mentioned above. Furthermore, double-talk becomes increasingly difficult to detect as an acoustic echo becomes large in comparison to the near-end signal.

An adaptive echo canceller arranged for overcoming the double-talking problem is proposed by Ochiai et al. in Echo canceller with two echo path models, IEEE Transactions on Communications, 25(6): 589–595, 1977. This document describes an echo canceller with a fixed (non-adaptive) foreground filter and an adaptive background filter. Each of the filters generates an estimate of the echo signal, The filter coefficients of the foreground filter are replaced with those of the background filter when the background filter provides a better estimate of the echo signal than the foreground filter. A similar system is disclosed U.S. Pat. No. 5,664,011 (Crochiere et al) where the foreground filter coefficients are replaced by the sum of the foreground and background filter coefficients.

During uncorrelated double-talking, the foreground filter is relatively immune from coefficient drift in the background filter. There are, however, drawbacks to this approach. In the event the filter coefficients of the background filter diverge and are subsequently re-converged, there may be a relatively long delay before the background filter works back to providing a better error signal than the foreground filter. As a result, the convergence time for the foreground filter may be significantly delayed. This is particularly serious when double-talk is followed immediately by echo path variations because the echo canceller fails to track any variation until the background filter is re-converged. This causes a significant degradation of speech conversation.

For an echo canceller with two filters, the foreground filter is non-adaptive while the secondary filter uses a least-squares-type technique such as least squares, least mean squares, or normalized least mean squares. Double-talk causes divergence in filters adapted with these kinds of techniques result in a time delay before the filter coefficients return to track echo path variations again. Since echo paths continually change due to opening doors, moving persons, changing temperatures etc, echoes can become apparent during this delay.

SUMMARY OF THE INVENTION

It is an object of the present invention to provide an echo canceller which protects against double-talking and provides rapid convergence for echo path estimation due to random or systematic variations.

It is a further object of the present invention to ameliorate the disadvantages and limitations of known echo cancellers, or at least to provide the public with a useful alternative.

In an echo canceller according to the invention, a parallel filter structure is employed where one filter is strongly robust and will not diverge during double-talk, and another filter is weakly robust and will converge rapidly during echo path variation. The filter coefficients are exchanged between these two filters constantly so that both filters retain performance all the time even if double-talk and echo path variation may occur very closely in time. Consequently, the best of the two filters can be chosen for the final echo cancellation. This ensures smooth speed conversations at all time.

According to a first aspect of the invention there is provided an echo canceller for a communications system including:
  a receive input for receiving an input signal,
  a receive output coupled with the receive input,
  a return input for receiving a return signal,
  a return output,
  a first filter coupled with the receive input for generating a first estimate signal in response to the input signal,
  a first subtractor coupled with the return input and the first filter for generating a first error signal,
  a second filter coupled with the receive input for generating a second estimate signal in response to the input signal,
  a second subtractor coupled with the return input and the second filter for generating a second error signal,
  a controller coupled with the first and second subtractors and coupled with the return input, and for transferring one of the first or second error signals to the return output in response to criteria.

Preferably, the smallest of the first or second error signals is transferred to the return output.

Preferably, the controller determines the average power of the first error signal (pe1) and second error signal (Pe2) and the return signal (Pr) and in which the criteria is:
  if the average power of the first error signal is less than the average power of the second error signal (Pe1<Pe2) or the average power of the second error signal is greater than the average power of the return signal (Pe2>Pr) for a predetermined interval then the first error signal is transferred to the return output,
  otherwise, the second error signal is transferred to the return output.

Preferably, the first filter has first filter coefficients and a first adaptive process for modifying the first filter coefficients in response to the first error signal, and the second filter has second filter coefficients and a second adaptive process for modifying the second filter coefficients in response to the second error signal.

Preferably, the first adaptive process is arranged to converge during echo path variations and the second adaptive process is arranged not to diverge during double talk.

Preferably, the first and second filters are digital filters.

According to a second aspect of the invention there is provided an echo canceller for a communications system including:
  a receive input for receiving an input signal,
  a receive output coupled with the receive input,
  a return input for receiving a return signal,
  a return output,
  a first filter with first filter coefficients, and coupled with the receive input for generating a first estimate signal in response to the input signal,
  a first subtractor coupled with the return input and the first adaptive filter for generating a first error signal,
  a first adaptive process for modifying the first filter coefficients in response to the first error signal,
  a second filter with second filter coefficients, and coupled with the receive input for generating a second estimate signal in response to the input signal,
  a second subtractor coupled with the return input and the second adaptive filter for generating a second error signal,
  a second adaptive process for modifying the second filter coefficients in response to the second error signal,
  a controller coupled with the first and second subtractors and coupled with the return input for transferring one of the first or second error signals to the return output in response to criteria, and coupled with the first and second filters for updating the first or second filter coefficients in response to the criteria.

Preferably, the smallest of the first or second error signals is transferred to the return output.

Preferably, the controller determines the average power of the first error signal (pe1) and second error signal (Pe2) and the return signal (Pr) and the criteria is:
  if the average power of the first error signal is less than the average power of the second error signal (Pe1<Pe2) or the average power of the second error signal is greater than the average power of the return signal (Pe2>Pr) then the second error signal is transferred to the return output,
  else if the average power of the first error signal is less than the average power of the second error signal (Pe1<Pe2) or the average power of the second error signal is greater than the average power of the return signal (Pe2>Pr) for a predetermined interval then the first error signal is transferred to the return output and the second filter coefficients are updated with the first filter coefficients,
  else if the average power of the first error signal is greater than the average power of the second error signal (Pe1>Pe2) and the average power of the second error signal is less than the average power of the return signal (Pe2<Pr) for the predetermined interval then the second error signal is transferred to the return output and the first filter coefficients are updated with the second filter coefficients.

Preferably, the first and second adaptive processes use a combination of a least-squares and a least absolute distance algorithm, Preferably, the first and second adaptive processes use a Huber function.

Preferably, the first adaptive process is arranged to converge during echo path variations and the second adaptive process is arranged not to diverge during double talk.

Preferably, the first and second adaptive processes are disabled if the input signal is below a threshold for a predetermined interval.

According to a third aspect of the invention there is provided a method of canceling an echo in a communication system with a receive input for receiving an input signal, a receive output coupled with the receive input, a return input for receiving a return signal, a return output, a first filter with first filter coefficients and a second filter with second filter coefficients, the method including:

generating a first estimate signal in response to the input signal, subtracting the first estimate signal from the return signal to determine a first error signal, modifying the first filter coefficients in response to the first error signal, generating a second estimate signal in response to the input signal, subtracting the second estimate signal from the return signal to determine a second error signal, modifying the second filter coefficients in response to the second error signal, transferring one of the first or second error signals to the return output in response to criteria, and updating the first or second filter coefficients in response to the criteria.

According to a forth aspect of the invention there is provided a method of canceling an echo in a communication system with a receive input for receiving an input signal, a receive output coupled with the receive input, a return input for receiving a return signal, a return output, two or more first filters with respective first filter coefficients and, two or more second filters with respective second filter coefficients, the method including;

separating the input signal into two or more sub-band input signals, separating the return signal into two or more sub-band return signals, generating first estimate signals in response to the sub-band input signals, subtracting the first estimate signals from respective ones of the sub-band return signals to determine first error signals, modifying the first filter coefficients in response to respective ones of the first error signals, generating second estimate signals in response to the sub-band input signals, subtracting the second estimate signals from respective ones of the sub-band return signals to determine second error signals, modifying the second filter coefficients in response to respective ones of the second error signals, applying a weighting function to respective ones of the first or second error signals in response to criteria, and transferring an output from the weighting function to the return output.

Further aspects of the invention will become apparent from the following description, which is given by way of example only,

BRIEF DESCRIPTION OF THE DRAWINGS

Embodiments of the invention will now be described with reference to the accompanying drawings in which.

DESCRIPTION OF THE PREFERRED EXAMPLES

Figure 3:
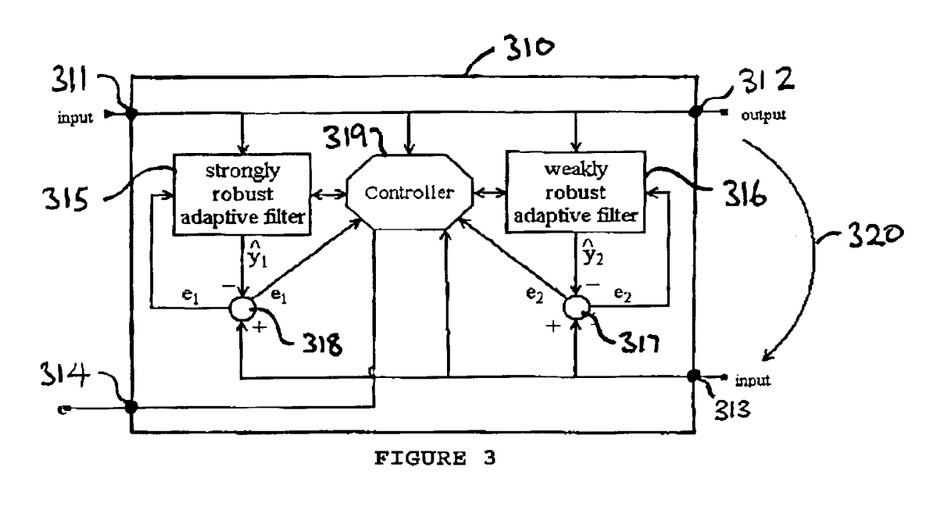
FIG. 3 is a block diagram illustrating an echo canceller according to the invention

FIG. 3 shows a block diagram of an echo canceller according to the invention. The echo canceller 310 includes a receive input port 311, a receive output port 312, a send input port 313, and send output port 314. A far-end communications signal x(n) passes between receive input port 311 and receive output port 312. An echo path 320 with an unknown transfer function h(n) exists between receive output port 312 to send input port 313, resulting in a return signal y(n) being received at the send input port 313. An echo error signal is transmitted back to the far-end from send output port 314.

There are two parallel adaptive filters operating simultaneously to model the echo path 320 and provide estimates of the return signal y(n). A first filter 315 is coupled with the receive input 311 and receives the communications signal x(n). The first adaptive filter 315 has first filter coefficients and generates a first estimate $\hat{y}_1(n)$ of return signal y(n) in response to the input signal x(n). A second adaptive filter 316 is also coupled with the receive input 311 and receives the communications signal x(n). The second adaptive filter 316 has second filter coefficients and generates a second estimate $\hat{y}_2(n)$ of return signal y(n) in response to the input signal x(n).

The first estimate signal $\hat{y}_1(n)$ from the first adaptive filter 315 is subtracted from the return signal y(n) by a first subtractor 318 to generate a first error signal $e_1(n)$. The second estimate signal $\hat{y}_2(n)$ from the second adaptive filter 316 is subtracted from the return signal y(n) by a second subtractor 317 to generate a second error signal $e_2(n)$.

A controller 319 is coupled with the subtractors 317 and 318 for receiving the first and second error estimates $e_1(n)$ and $e_2(n)$, and is coupled with the send output port 314. The controller 319 use criteria, described below, to determine which of the error signals $e_1(n)$ or $e_2(n)$ to pass to the send output port 314 and passes that error signal to the send output port 314.

At the same time the first error signal $e_1(n)$ is feed back to the first adaptive filter 315 and is used to adapt the first filter coefficients continuously so as to minimize the first error signal $e_1(t)$, the second error signal $e_2(n)$ is feed back to the second adaptive filter 316 and is used to adapt the second filter coefficients continuously so as to minimize the second error signal $e_2(n)$.

The controller 319 is also coupled to filters 315 and 316 for accessing the first filter coefficients of first filter 315 and the second filter coefficients of second filter 316. The controller uses the criteria to determine if one of the adaptive filters if performing consistently better that the other one. The controller 319 replaces the first filter coefficients with the second filter coefficients when first filter 315 performs consistently better over a period of time, or replaces the second filter coefficients with the first filter coefficients when second filter 316 performs consistently better over a period of time. After having its coefficients replaced the first or second adaptive filters 315, 316 resumes its adaptive processing.

The decision of which error signal, $e_1(n)$ or $e_2(n)$, to passes to send output 314 and whether to replace filter coefficients is based on the instantaneous power of $e_1(n)$, $e_2(n)$ and y(n) averaged over a specific period of time. The smaller power between the two errors signals, $e_1(n)$ or $e_2(n)$, will be used for transmission to the far-end.

The controller chooses the best estimate of error signals $e_1(n)$ or $e_2(n)$ for output and for the exchange the filter coefficients based on the estimate the power P of a signal x, denoted by $P_x(k)$. The power estimate is computed either by the sum of squares of the most recent samples, or the sum of absolute values of the most recent samples. The average power estimate is calculated by dividing the power estimate by the number of samples.

The complete control strategy for the controller is shown in the following tables.

Conditions for different operating modes are:

| Operating Mode | Conditions for mode |
|---|---|
| ST (Single Talk) | If $p_{e1}(k) < p_{e2}(k)$ or $p_{e2}(k) > p_y(k)$ for less than K blocks |
| DT (Double Talk) | If $p_{e1}(k) < p_{e2}(k)$ or $p_{e2}(k) > p_y(k)$ for consecutive K blocks |
| TR (TRacking) | If $p_{e1}(k) > p_{e2}(k)$ and $p_{e2}(k) < p_y(k)$ for consecutive K blocks |

Actions taken in different operating modes are.

| Operating Mode | Action |
|---|---|
| ST (Single Talk) | Use $e_2(k)$ as the output error signal. No update of filter coefficients. |
| DT (Double Talk) | Use $e_1(k)$ as the output error signal. Replace second filter coefficients with first filter coefficients. |
| TR (TRacking) | Use $e_2(k)$ as the output error signal. Replace first filter coefficients with second filter coefficients. |

In operation, receive input signal x(k), representing a far-end signal, is applied to receive input port 311. Signal x(k) is passed to filters 315 and 316, and to receive output port 312

Send input port 313 receives send input signal y(k) consisting of an echo signal plus any double-take and background noise in the receiving room. First adaptive filter 315 generates a first signal estimate $\hat{y}_1(n)$, as an estimate of echo signal h(n)*x(n), in response to signal x(k). Likewise, filter 316 generates a second signal estimate $\hat{y}_2(n)$, as an estimate of echo signal h(n)*x(n), in response to signal x(k). Subtractor 318 generates error signal $e_1(n)$, representing the difference between signals $\hat{y}_1(n)$ and y(k). Subtractor 317 generates error signal $e_2(n)$, representing the difference between signals $\hat{y}_2(n)$ and y(n). Signal $e_1(n)$ and $e_2(n)$ are feed back to filter 315 and 316, respectively, for adaptive processing.

The controller 319 determines whether to perform the update operation based on the powers of $e_1(n)$, $e_2(n)$ and y(n). Depending on the ratios of the powers, either first or second filter coefficients are overwritten by the other filter coefficients. The powers calculated are instantaneous signal powers of $e_1(n)$, $e_2(n)$ and y(n) averaged over a specific period of time.

Controller provides additional protection by way of an energy detector. The energy detector detects when signal x(k) is below a threshold, indicating the presence of an idle state. The detector compares predetermined thresholds to instantaneous signal power of x(k) averaged over a specific period of time. Upon receiving an indication, the controller will disable the adaptation process of both filters until the detection signal is removed. This prevents the first and second filters adapting filter coefficients in response to only double-talk or background noise from the near end, The first adaptive filter 315 has a weakly robust adaptive algorithm that will not diverge during double-talk and the second adaptive filter 316 has a strongly robust adaptive algorithm that will converge rapidly during echo path variation.

The following description gives details of the algorithm for the weakly and strong robust adaptation algorithms.

Consider a signal x(n) transmitted over a communications system. The return signal y(n) is $$y(n) = \sum_{k=0}^{\infty} h(k)x(n-k) + v(n) \quad \text{Equation (1):}$$

where h(k)x(n−k) is the echo signal and v(n) is the background noise plus double-talk produced by a near-end speaker. The echo cancellation is achieved by finding an estimate ŷ(n) of the echo signal and subtracting it from the return signal y(n).

The estimate ŷ(n) of the echo signal is $$\hat{y}(n) = \sum_{k=0}^{N-1} \hat{h}(k)x(n-k) \quad \text{Equation (2):}$$

where ĥ(k) is the estimate of the impulse response of the echo path with a filter length N.

The estimate ŷ(n) is subtracted from the return signal y(n) and residual echo is left in the system which is given by:

$$e(n) = y(n) - \hat{y}(n) \quad \text{Equation (3):}$$

To handle double-talk the second adapted filter 316 must not be affected by sudden near-end speech. The second adaptive filter 316 must be robustness to double talk while maintaining the fast convergence for small errors and the capability to track variations in the channel quickly. To achieve this a hybrid least-squares and least absolute distance measure algorithm is used.

There are many kinds of such hybrid error functions. Suitable functions include the Huber function as described by P. J. Huber in 'Robust estimation of a location parameter', Annals of Mathematical Statistics, 35:73–101, 1964; and the Andrews function as described by D. F. Andrews in 'A robust method for multiple linear regression', Technometrics, 16:523–531, 1974. The current invention uses the Huber function, which consists of a parabola prolonged by two tangents, and can be written as:

$$J(e) = \begin{cases} E[e^2], & \text{if } |e| \leq cs \\ E[cs(2|e| - cs)], & \text{if } |e| < cs \end{cases} \quad \text{Equation (4):}$$

Where c and s are constants.

The first order derivative neglecting the expectation is given by:

$$\nabla hJ(e) = \begin{cases} -2e \times x, & \text{if } |e| \leq cs \\ -2 \, \text{sign}(e) \times x, & \text{if } |e| < cs \end{cases} \quad \text{Equation (5):}$$

The stochastic gradient algorithm is given by:

$$\hat{h}(n) = \begin{cases} \hat{h}(n-1) + (\mu e(n)/X(n)^T x(n)) \times x(n), & \text{Equation (6):} \\ \text{if } |e| \leq cs \\ \hat{h}(n-1) + \text{sign}(e(n))(\mu s/x(n)^T x(n)) \times x(n), \\ \text{if } |e| < cs \end{cases}$$

The Huber function has a reasonable portion of least-squares measure after retaining robustness throughout. By changing the scaling parameter S suitably, different degrees of robustness can be achieved. For example, for a fixed c and a large s the Huber function behaves like a least-squares measure and the resultant method resembles the conventional normalized least-mean-square (NLMS) algorithm. If s is small, the Huber function behaves like a least-absolute distance measure and the method has strong robustness.

The strongly robust adaptive filter 316 is implemented using a small s. The weakly robust first adaptive filter 315 can be implemented using a large s.

In an alternative embodiments, s can be chosen to be a fixed value in advance, such that $s=s_1$ for a strongly robust adaptive filter where $s_1$ is small, and $s=s_2$ for a weakly robust adaptive filter where $s_2$ is a relatively larger quantity, s can also be adjusted via the error function as follows:

$$s_1(k+1) = \alpha_1 s_1(k) + (1-\alpha_1) \psi(e_1(k), s_1(k)) \quad \text{Equation (7):}$$

$$s_2(k+1) = \alpha_2 s_2(k) + \frac{(1-\alpha_2)}{\beta} \psi(e_2(k), s_2(k)) \quad \text{Equation (8):}$$

where:

$$\psi(e,s) = \min(|e|/s, c) \quad \text{Equation (9):}$$

Referring to Equations (7) and (8), if $\alpha_1$ is close to one the adaptation of $s_1(k)$ has longer memory, reacts slower to sudden change in $e_1(k)$, and therefore is more robust during double talk. However, it reacts slower to echo path variations. This is a strongly robust adaptive filter. If $\alpha_2$ is small and β less than one, more weights are skewed towards new data which allows the scale factor to vary faster with $e_2(k)$. This results in a less robust adaptation which is faster at tracking echo path variations. This is a weakly robust adaptive filter.

Figure 4:
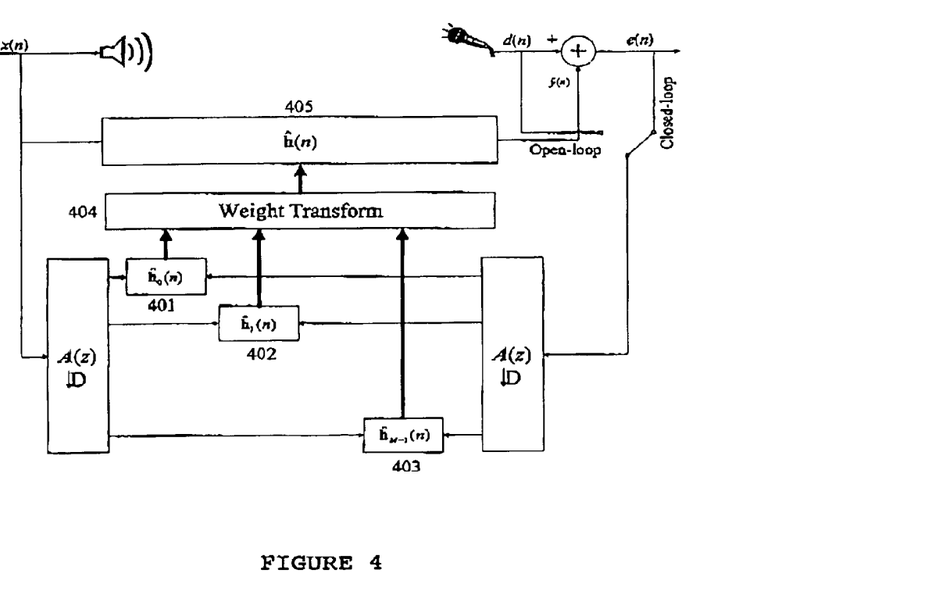
FIG. 4 is a block diagram illustrating a delay-less sub-band adaptive filter structure.

Referring to FIG. 4, the filters can be implemented in the frequency domain for greater speed. A frequency domain implementation of the echo canceller is described below. In the delay-less sub-band echo canceller, the echo path is modelled in sub-bands with a set of adaptive filters $\hat{h}_0$(401), $\hat{h}_1$(402), . . . ,$\hat{h}_{M-1}$(403). These sub-band filters are then collectively transformed to a single full-band filter 404 via a weight transform 405, such as the DFT-FIR weight transform method, which is described by J. Huo, S. Nordholm, and Z. Zang in 'New weight transform schemes for delayless subband adaptive filters', In Globecom 2001, 2001.

This full-band filter 405 models the acoustic channel. By separating the paths for adaptation and echo cancellation the analysis/synthesis system in the signal path, and thus the signal path delay, is avoided whilst the desired features of sub-band processing such as signal de-correlation and computational efficiency are retained.

The signal x(n) is filtered by a set of L tap analysis filters $a_m(n)$ and decimated by a factor of D to form a set of M sub-signals $x_m(k)$. This is written as:

$$x_m(k) = a_m^H x(kD) \quad \text{Equation (10):}$$

where $$x(kD) \begin{bmatrix} x(kD) \\ x(kD-1) \\ \vdots \\ x(kD-L+1) \end{bmatrix} \quad \text{Equation (11):}$$

The analysis filters are related to a single prototype filter:

$$A_m(z) = A_0(zW_M^m) \quad \text{Equation (12):}$$

where $A_m(z)$ is the transfer function of the mth analysis filter, $A_0(z)$ is that of the prototype filter and $W_M^m = e^{-j2m\pi/M}$. Such a set of filters is referred to as a uniform DFT-modulated filter bank and can be implemented very efficiently. A discussion of the uniform DFT-modulated filter bank can be found in P. P. Vaidyanathan, 'Multirate Systems and Filter Banks', Prentice Hall, 1993.

The delay-less sub-band adaptive filter can be configured in either an open-loop or a closed-loop manner. For both configurations, the sub-band adaptive filters are chosen to minimize the sub-band error signal power In the open-loop configuration, the sub-band error signal $e_m(k)$ is generated locally in the mth sub-band as:

$$e_m(k) = d_m(k) - \hat{h}_m^H x_m(k) \quad \text{Equation (14):}$$

where the sub-band reference signal $d_m(k)$ is formed from d(n) in the same way as Equation (10).

In the closed-loop configuration the sub-band error signals are obtained by analyzing the full-band error signal e(n) by $a_m$ as in Equation (10). By utilizing the full-band error signal it is possible for the closed-loop delay-less sub-band adaptive filter to achieve the optimal Wiener solution, free of alias distortion.

To achieve robustness, the parallel structure in FIG. 3 is applied in each sub-band 401, 402, 403 individually. The sub-band signals are decimated by a factor of D=M/2 and used to adapt an N/D tap adaptive filter $\hat{h}_m(k)$, where m is the index of the sub-bands, and k is the sub-band time index.

The echo canceller was tested using a full-band filter length of 1024(N=1024), 128 sub-bands (M=128) with a decimation factor of 64(D=64). An echo path variation was simulated by switching the signal from a first microphone to a second microphone 24 cm away from the first one at sample 110,000.

Figure 5:
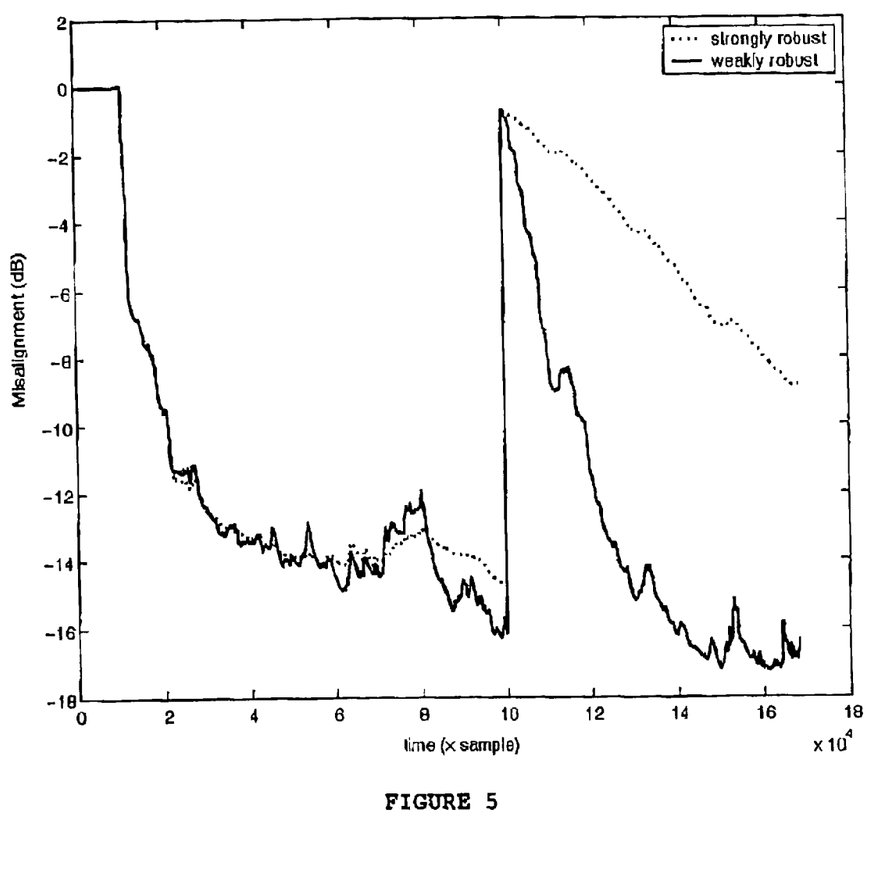
FIG. 5 is a graph of the echo tracking behaviour of weakly and strongly robust filters.

Referring to FIG. 5, the strongly robust adaptive filter (shown by the dotted line) tracks more slowly than the weakly robust.

Figure 6:
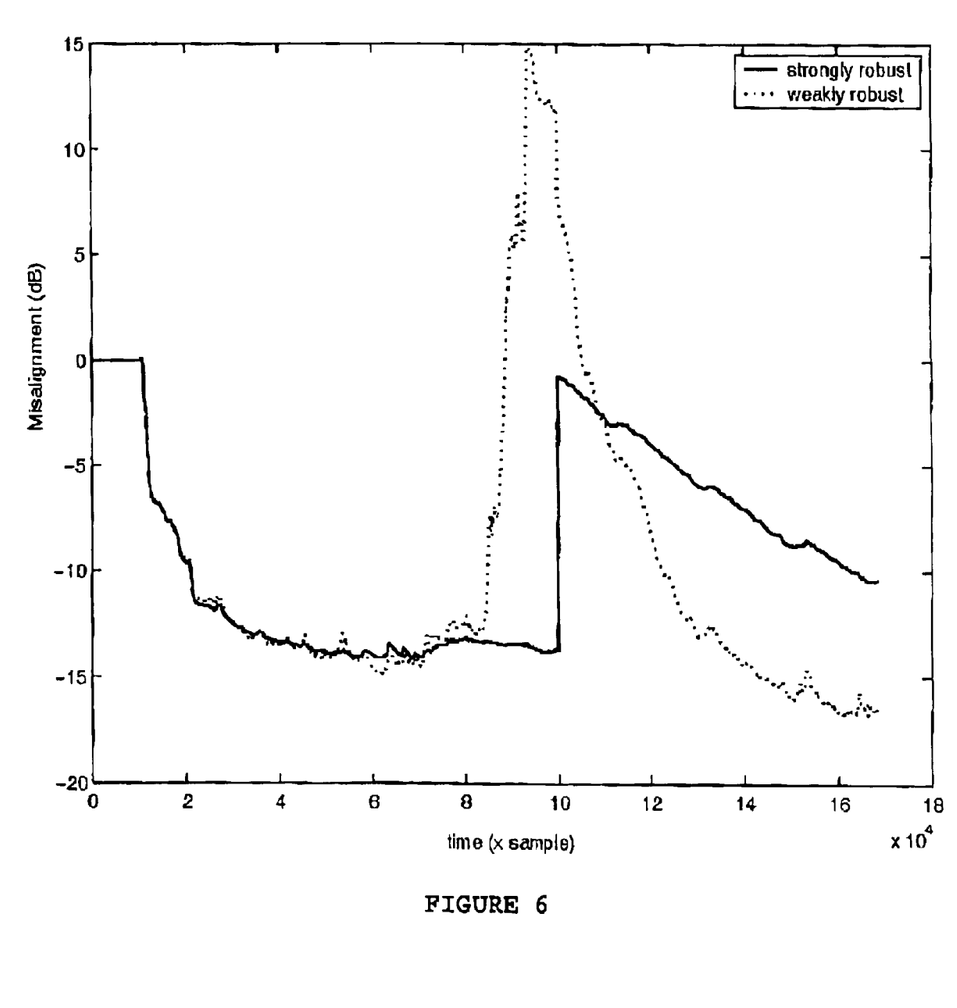
FIG. 6 is a graph of the double-talk behaviour of weakly and strongly robust filters.

Referring to FIG. 6, when double-talk (near-end speech) is introduced from sample 80,000 to 100,000 the strongly robust adaptation (shown by a solid line) withstands the double-talk perturbation.

Figure 7:
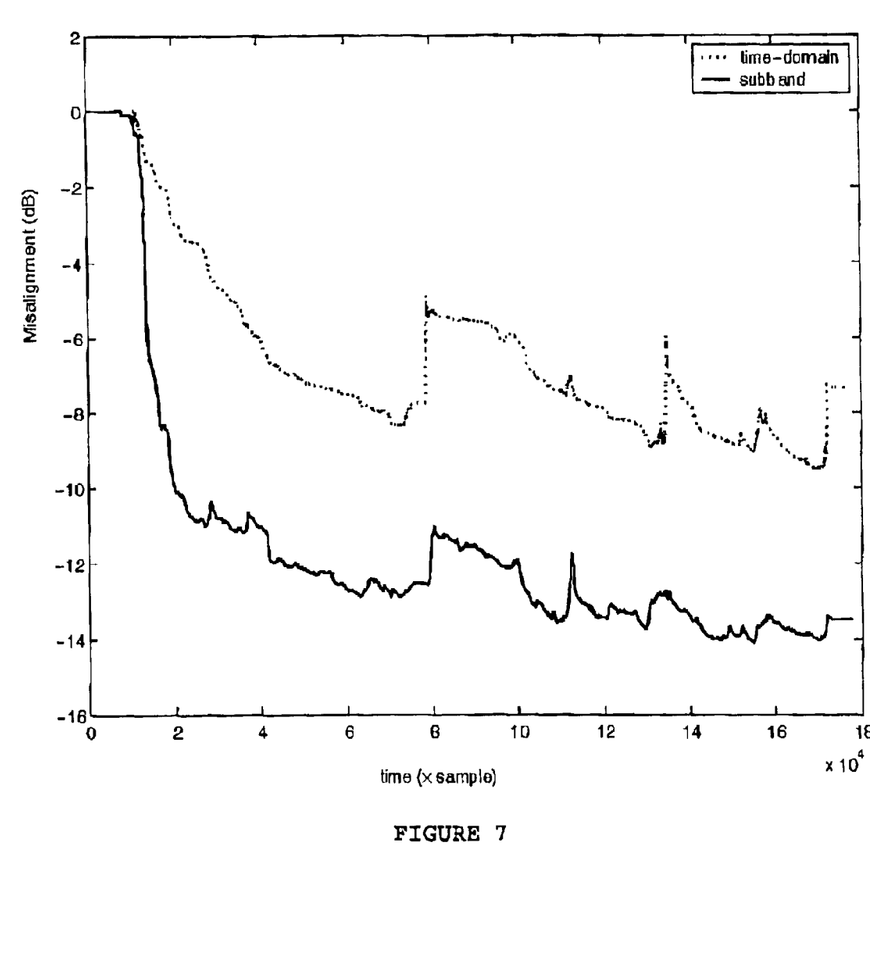
FIG. 7 is a graphical comparison of time-domain and sub-band implementation of a normal robust filter.

FIG. 7 shows a comparison of the performance of the sub-band algorithm (shown by a solid line) relative to the time-domain (full-band) implementation (shown by a dotted line). The sub-band algorithm shown in solid line outperforms the full-band algorithm shown with a dotted line in terms of convergence rate.

Figure 8:
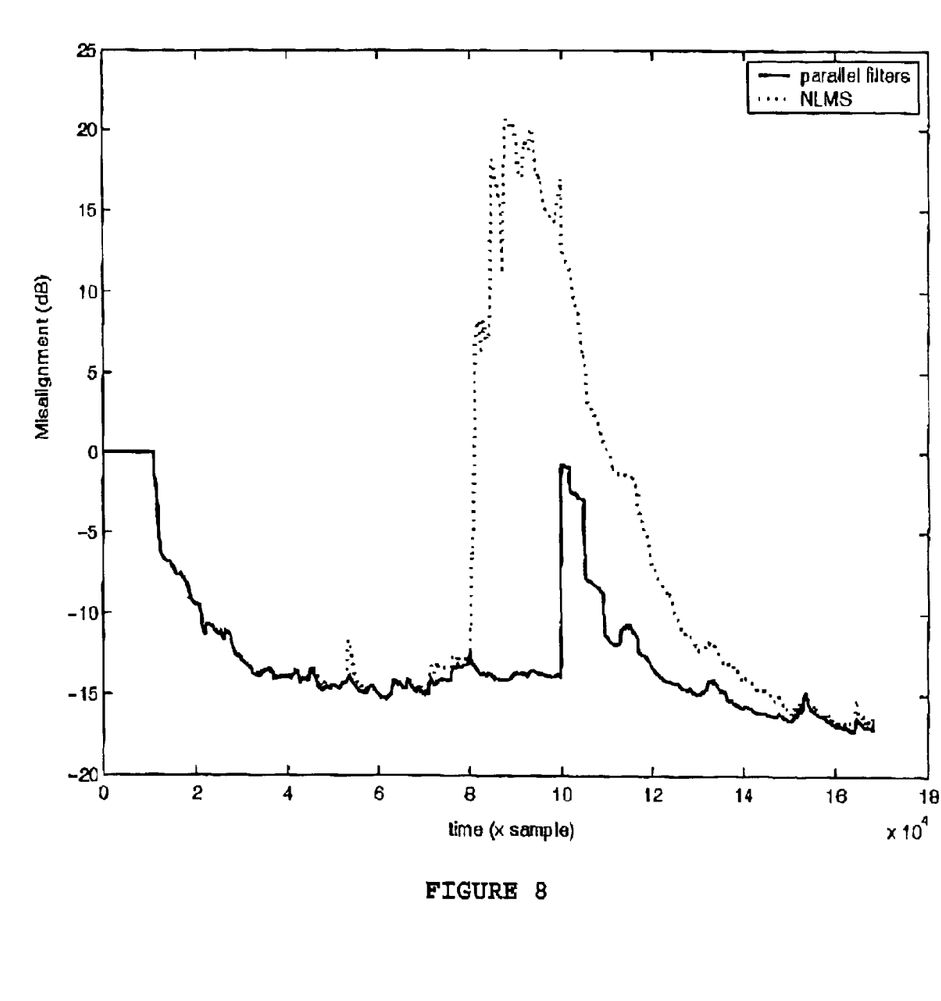
FIG. 8 is a graph of robustness against double-talk and echo path variation.

FIG. 8 shows a comparison of the performance of the parallel filter echo canceller and a normalized least-mean-square (NLMS) adaptive filter during the occurrence of double-talk followed immediately by an echo path variation as described above. The parallel filter echo canceller (shown by the solid line) has a good compromise between robustness during double-talk and convergence speed during tracking of echo path variations.

Figure 9:
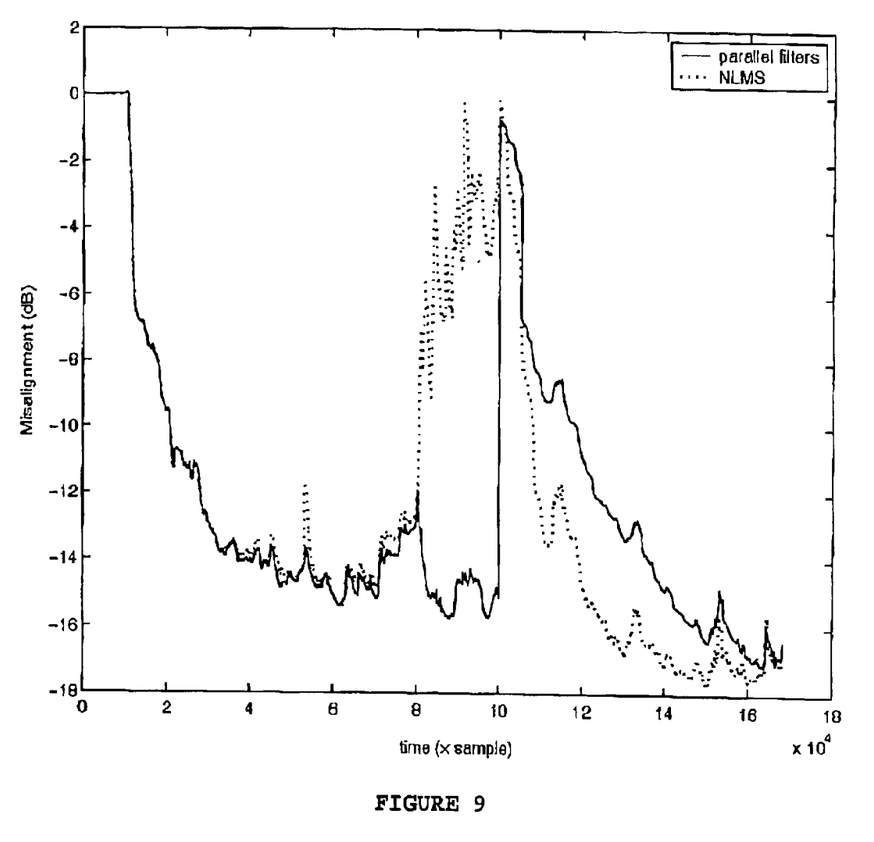
FIG. 9 is a graph of robustness against whispering near-end talker and echo path variation.

When near-end speech is at the same level as the residual echo it may be difficult to pick up the presence of the near-end speech for most double-talk detectors. This situation resembles a slow whispering by the near-end speaker, which causes the NLMS to diverge slowly. The proposed algorithm is tested against this situation and the result is shown in FIG. 9. This situation is handled by the parallel filter (shown by a solid line).

In an echo canceller according invention, a double-talk detector is not required. At least one of the filters is robust against double-talk and the coefficients of the filter will not drift away from the steady state which avoids divergence during double-talk. This filter is also robust in the situation where the near-end speech is of comparable magnitude with the residual echo. Therefore, it provides better immunity to double-talking and ensures the howling effect will not occur. Also, without a double-talk detector hardware complexity in the design of the filters is reduced.

It has applications in telephone channels including PSTN, ISDN and mobile communication networks, and/or an acoustic channel in teleconferences, and any other applications with speech operation where echo cancellation is desired.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claimed is:

1. An echo canceller for a communications system including:
   a receive input for receiving an input signal,
   a receive output coupled with the receive input,
   a return input for receiving a return signal,
   a return output,
   a first filter having first coefficients coupled with the receive input for generating a first estimate signal in response to the input signal,
   a first subtracter coupled with the return input and the first filter for generating a first error signal,
   a second filter having second filter coefficients coupled with the receive input for generating a second estimate signal in response to the input signal,
   a second subtracter coupled with the return input and the second filter for generating a second error signal,
   a controller coupled with the first and second subtracters and coupled with the return input, and for transferring one of the first or second error signals to the return output in response to criteria, and
   the echo canceller having processes operating concurrently for adapting the first and second filter coefficients response to the first and second error signals respectively.

2. The echo canceller of claim 1 in which a smallest of the first or second error signals is transferred to the return output.

3. The echo canceller of claim 1 in which the first filter includes a first of the of the processes for adapting the first filter coefficients in response to the first error signal, and the second filter includes a second of the processes for adapting the second filter coefficients in response to the second error signal.

4. The echo canceller of claim 3 in which the first adaptive process is arranged to converge during echo path variations and the second adaptive process is arranged not to diverge during double talk.

5. The echo canceller of claim 1 in which the first and second filters are digital filters.

6. An echo canceller for a communications system including:
   a receive input for receiving an input signal,
   a receive output coupled with the receive input,
   a return input for receiving a return signal,
   a return output,
   a first filter with first filter coefficients, and coupled with the receive input for generating a first estimate signal in response to the input signal,
   a first subtracter coupled with the return input and the first adaptive filter for generating a first error signal,
   a first adaptive process for modifying the first filter coefficients in response to the first error signal, a second filter with second filter coefficients, and coupled with the receive input for generating a second estimate signal in response to the input signal,
   a second subtracter coupled with the return input and the second adaptive filter for generating a second error signal,
   a second adaptive process operating concurrently with the first adaptive process for modifying the second filter coefficients in response to the second error signal,
   a controller coupled with the first and second subtracters and coupled with the return input for transferring one of the first or second error signals to the return output in response to criteria, and coupled with the first and second filters for updating the first or second filter coefficients with a value of the other of said coefficients in response to the criteria.

7. The echo canceller of claim 6 in which a smallest is of the first or second error signals is transferred to the return output.

8. The echo canceller of claim 6 in which first and second adaptive processes use a combination of a least-squares and a least absolute distance algorithm.

9. The echo canceller of claim 8 in which first and second adaptive processes use a Huber function.

10. The echo canceller of claim 6 in which the first adaptive process is arranged to converge during echo path variations and the second adaptive process is arranged not to diverge during double talk.

11. The echo canceller of claim 6 in which the first and second adaptive processes are disabled if the input signal is below a threshold for a predetermined interval.

12. A method of cancelling an echo in a communication system with a receive input for receiving an input signal, a receive output coupled with the receive input, a return input for receiving a return signal, a return output, a first filter with first filter coefficients and a second filter with second filter coefficients, the method including:

generating a first estimate signal in response to the input signal, subtracting the first estimate signal from the return signal to determine a first error signal, modifying the first filter coefficients in response to the first error signal, generating a second estimate signal in response to the input signal, subtracting the second estimate signal from the return signal to determine a second error signal, modifying the second filter coefficients concurrently with the first filter coefficients in response to the second error signal, transferring one of the first or second error signals to the return output in response to criteria, and updating the first or second filter coefficients with a value of the other of said coefficients in response to the criteria.

13. The method of claim 12 in which a smallest of the first or second error signals is transferred to the return output.

14. The method of claim 12 which further includes determining average powers of the first error signal (pe1) and second error signal (Pe2) and the return signal (Pr) and in which the criteria is:

if the average power of the first error signal is less than the average power of the second error signal (Pe1<Pe2) or the average power of the second error signal is greater than the average power of the return signal (Pe2>Pr) then the second error signal is transferred to the return output, else if the average power of the first error signal is less than the average power of the second error signal (Pe1<Pe2) or the average power of the second error signal is greater than the average power of the return signal (Pe2>Pr) for a predetermined interval then the first error signal is transferred to the return output and the second filter coefficients are updated with the first filter coefficients, else if the average power of the first error signal is greater than the average power of the second error signal (Pe1>Pe2) and the average power of the second error signal is less than the average power of the return signal (Pe2<Pr) for the predetermined interval then the second error signal is transferred to the return output and the first filter coefficients are updated with the second filter coefficients.

15. The method of claim 12 in which the first and second adaptive processes use a combination of a least-squares and a least absolute distance algorithm.

16. The canceller of claim 15 in which the first and second adaptive processes use a Huber function.

17. The method of claim 12 in which the first filter coefficients converge during echo path variations and the second filter coefficients do not diverge during double talk.

18. The method of claim 12 in which the first and second filter coefficients are not modified if the input signal is below a threshold for a predetermined interval.

19. A method of cancelling an echo in a communication system with a receive input for receiving an input signal, receive output coupled with the receive input, a return input for receiving a return signal, a return output, two or more first filters with respective first filter coefficients and, two or more second filters with respective second filter coefficients, the method including:

separating the input signal into two or more sub-band input signals, separating the return signal into two or more sub-band return signals, generating first estimate signals in response to the sub-band input signals, subtracting the first estimate signals from respective ones of the sub-band return signals to determine first error signals, modifying the first filter coefficients in response to respective ones of the first error signals, generating second estimate signals in response to the sub-band input signals, subtracting the second estimate signals from respective ones of the sub-band return signals to determine second error signals, modifying the second filter coefficients concurrently with the first filter coefficients in response to respective ones of the second error signals, applying a weighting function to respective ones of the first or second error signals in response to criteria, and transferring an output from the weighting function to the return output.

* * * * *